United States Patent
Snider, Jr. et al.

(10) Patent No.: US 6,365,830 B1
(45) Date of Patent: *Apr. 2, 2002

(54) OVERHEAD CABLING SYSTEM FOR A TELECOMMUNICATIONS SWITCHING CENTER

(75) Inventors: Randle Paul Snider, Jr., Plano; Kevin C. Gentry, Princeton; Marian Kutis, Richardson; Joe Michael Jones, Garland, all of TX (US)

(73) Assignee: Ericsson Inc., Richardson, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/607,267

(22) Filed: Jun. 30, 2000

(51) Int. Cl.[7] ................................................ H02G 3/04
(52) U.S. Cl. .................... 174/48; 174/95; 52/220.7; 361/826; 439/715
(58) Field of Search ..................... 174/48, 49, 68.1, 174/68.3, 95, 97, 99 R, 100, 101; 52/220.7, 220.8, 287.1; 248/49, 68.1; 361/826, 827, 829; 439/210, 215, 715, 716

(56) References Cited

U.S. PATENT DOCUMENTS

| 3,633,628 A | * | 1/1972 | Duquette ................... 138/116 |
| 3,713,613 A | * | 1/1973 | Searls ......................... 248/49 |
| 3,761,603 A | * | 9/1973 | Hays et al. .................. 174/101 |
| 4,166,195 A | * | 8/1979 | Schwab ........................ 174/95 |
| 4,320,261 A | * | 3/1982 | Scerbo et al. ............... 361/829 |
| 4,990,722 A | * | 2/1991 | Benito Narazo ............. 174/97 |
| 5,271,585 A | * | 12/1993 | Zetena, Jr. .................... 248/49 |
| 5,359,143 A | * | 10/1994 | Simon ........................ 174/101 |
| 5,580,014 A | * | 12/1996 | Rinderer ...................... 248/49 |
| 5,792,992 A | * | 8/1998 | Handler ...................... 174/101 |
| 5,969,292 A |   | 10/1999 | Snider et al. ................. 174/48 |
| 6,147,304 A | * | 11/2000 | Doherty ....................... 174/48 |
| 6,215,064 B1 | * | 4/2001 | Hoble et al. .............. 174/49 X |

* cited by examiner

Primary Examiner—Dean A. Reichard
Assistant Examiner—Dhiru R Patel
(74) Attorney, Agent, or Firm—Arthur I. Navarro; Godwin Gruber, P.C.

(57) ABSTRACT

An overhead cabling system (7) for a telecommunications switching center (5) including a plurality of cable tray assemblies (15) and one or more cable ladder assemblies (20). The cable ladder assemblies (20) are supported by the cable tray assemblies (15) and extend cross-aisle between two or more suites (160). The cable tray assemblies (15) are mounted to the tops of the cabinets (10) which provide the sole support for the cable tray assemblies (15). The cable tray assemblies (15) are modular and designed to fit on top of a single cabinet (10).

24 Claims, 5 Drawing Sheets

OVERHEAD CABLING SYSTEM FOR A TELECOMMUNICATIONS SWITCHING CENTER

RELATED APPLICATION

This application is related to U.S. Pat. No. 5,969,292 (the '292 Patent) entitled "Overhead cabling system for telecommunication switching center" by Snider, Jr. et al. filed Nov. 7, 1997, and issued Oct. 19, 1999, the entirety of which is incorporated herein by reference.

FIELD OF THE INVENTION

The present invention relates generally to cabling systems for a telecommunications switching center, and more particularly, to an overhead cabling system for a telecommunications switching center which allows efficient cross-aisle cable routing, does not consume additional floor space, and is capable of withstanding seismic disturbances.

BACKGROUND OF THE INVENTION

Without limiting the scope of the invention, its background is described in connection with cabling systems used to connect switching cabinets in a telecommunications switching center. In a telecommunications switching center many switching cabinets are installed. The switching cabinets are commonly placed side by side to form a row of cabinets known as a "suite". When two rows are placed back to back this is known as a "double suite".

It is often necessary to route cables from one cabinet to another cabinet in the same suite. Additionally, it is often necessary to route cables from a cabinet in one suite to a cabinet in another suite across an aisle. This is known as "cross-aisle" routing.

The prior overhead cabling systems used cable end chutes to route all cross-aisle cables. These cable end chutes are placed at one end of a suite of cabinets. Suites are then connected to other suites by a cable ladder assembly running from the cable end chute of one suite to the cable end chute of the next suite. This use of a cable ladder assembly and cable end chute to route cables in this manner is illustrated in FIG. 1 of the '292 Patent. Essentially, with the prior art cabling systems, such as those of the '292 Patent, cross-aisle cables run through a single point in the suite, namely the cable end chute. Problems caused by this single point routing configuration include cable congestion, inadequate heat dissipation, difficulty of installation, and the lack of capacity to handle the number of cables required by the newer class of telecommunications switching systems.

The cable end chutes also consumes valuable floor space in the telecommunications switching center. Other problems which have been encountered in the past include raceway congestion, inconvenient cable transitions from the cable raceway to the switching cabinet, difficulty of installation, and failure to meet structural requirements for seismically active regions.

A cabling system that eliminates the problems associated with the use of prior art cable end chutes would provide numerous advantages.

SUMMARY OF THE INVENTION

The present invention provides a system for routing cables through a group for telecommunications switching cabinets. The overhead cabling system of the present invention comprises two main assemblies: a plurality of cable tray assemblies and one or more cable ladder assemblies. The cable ladder assemblies are supported by the cable tray assemblies and extend across aisles between two or more suites. The cable ladder assemblies provide a raceway to route cabling across aisles between suites. The cable tray assemblies are mounted to the tops of the cabinets which provide the sole support for the cable tray assemblies. With the present invention, cable tray assemblies can be used to route cables from the cable ladder assembly to the individual cabinets in a suite or to cabinets of different suites to achieve cross-aisle routing. The cable tray assemblies are also used to route cabling between cabinets in the same suite.

The cable ladder assemblies may be placed across an aisle as needed. Each cable tray assembly could be used to support a cable ladder assembly if the number of cables required so many cable ladders.

A technical advantage of the present invention is the ability to run cables between cabinets using a shorter and more direct length of cable as compared to use of a prior art end chute cabling system. As such, with the present invention cabling system, better heat dissipation is achieved since cables are less crowded. In addition, the cabling system of the present invention facilitates repairs an/or modification of the cabinet installation or with less effort as compared to the prior art end chute cabling system since it is easier for a technician to identify a specific cable in the system.

Another technical advantage of the present invention is the ability to withstand seismic activity in earthquake prone areas that require up to a zone 4 level of certification by Bellcore.

BRIEF DESCRIPTION OF THE DRAWINGS

For a more complete understanding of the present invention, including its features and advantages, reference is made to the following detailed description of the invention, taken in conjunction with the accompanying drawings of which.

Corresponding numerals and symbols in the figures refer to corresponding parts in the detailed description unless otherwise indicated.

DETAILED DESCRIPTION OF PREFERRED EMBODIMENTS

While various embodiments of the present invention are discussed in detail below, it should be appreciated that the present invention provides many applicable inventive concepts which can be embodied in a wide variety of specific contexts. These specific embodiments discussed herein are merely illustrative of specific ways to make and use the invention, and do not delimit the scope of the invention.

Figure 1:
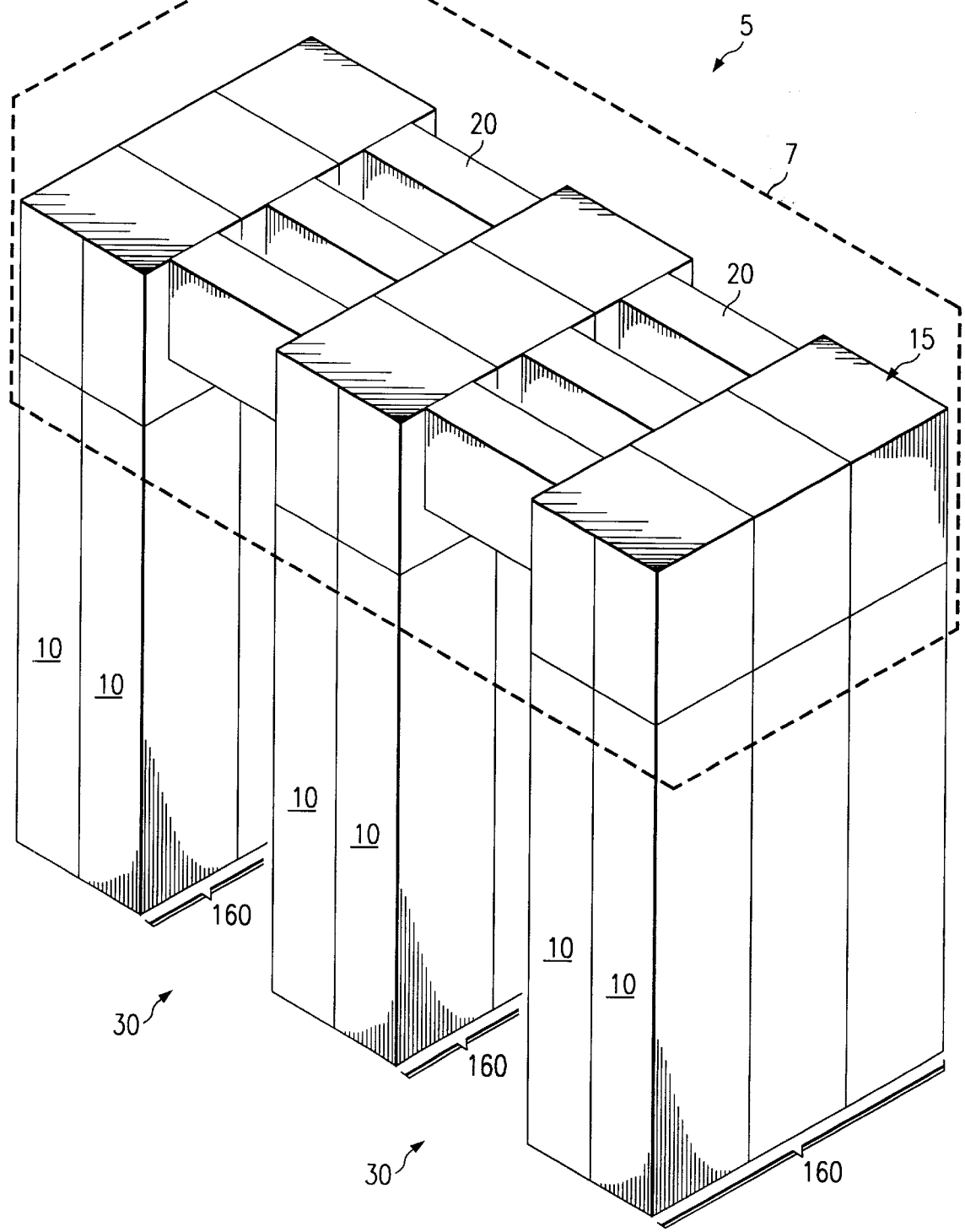
FIG. 1 depicts the overhead cabling system of the present invention.

Referring to FIG. 1, a telecommunications switching center using the overhead cabling system of the present invention is shown therein and indicated generally by the numeral 5 in FIG. 1. Specifically, the switching center 5 uses an overhead cabling system 7 designed to provide an overhead cable way for routing cables between suites 160 of telecommunications switching cabinets 10. For example, the overhead cabling system 7 may be used with the AXE series cabinets manufactured by Ericsson.

The switching cabinets 10 are typically arranged in rows with aisles between the rows. A row of side by side cabinets 10 is referred to in the industry as a "suite" 160. Typically, suites 160 are installed in a back-to-back configuration. A group consisting of a single line of cabinets 10 will be referred to herein as a suite. Two suites in a back-to-back configuration will be referred to as a double suite. For convenience, the terms "cabinet" and "cabinets", "suite" and "suites", "row" and "rows", and "aisle" and "aisles" will be referred to interchangeably throughout in connection with both the singular and plural forms of the terms and multiples of the same part will be identified with the same reference numeral both in the description and figures.

The overhead cabling system 7 of the present invention is seen to include an overhead cable ladder assembly 20 for running cable between switching cabinets 10. Using the overhead cable ladder assembly 20 of the present invention, cabling can be run between cabinets 10 in different suites 160. As shown, the overhead cabling system 7 includes two main components—cable tray assemblies 15, and cable ladder assemblies 20. In this regard, the terms "assembly" and "assemblies" will be used interchangeably and referred to with a singe reference number.

Figure 5:
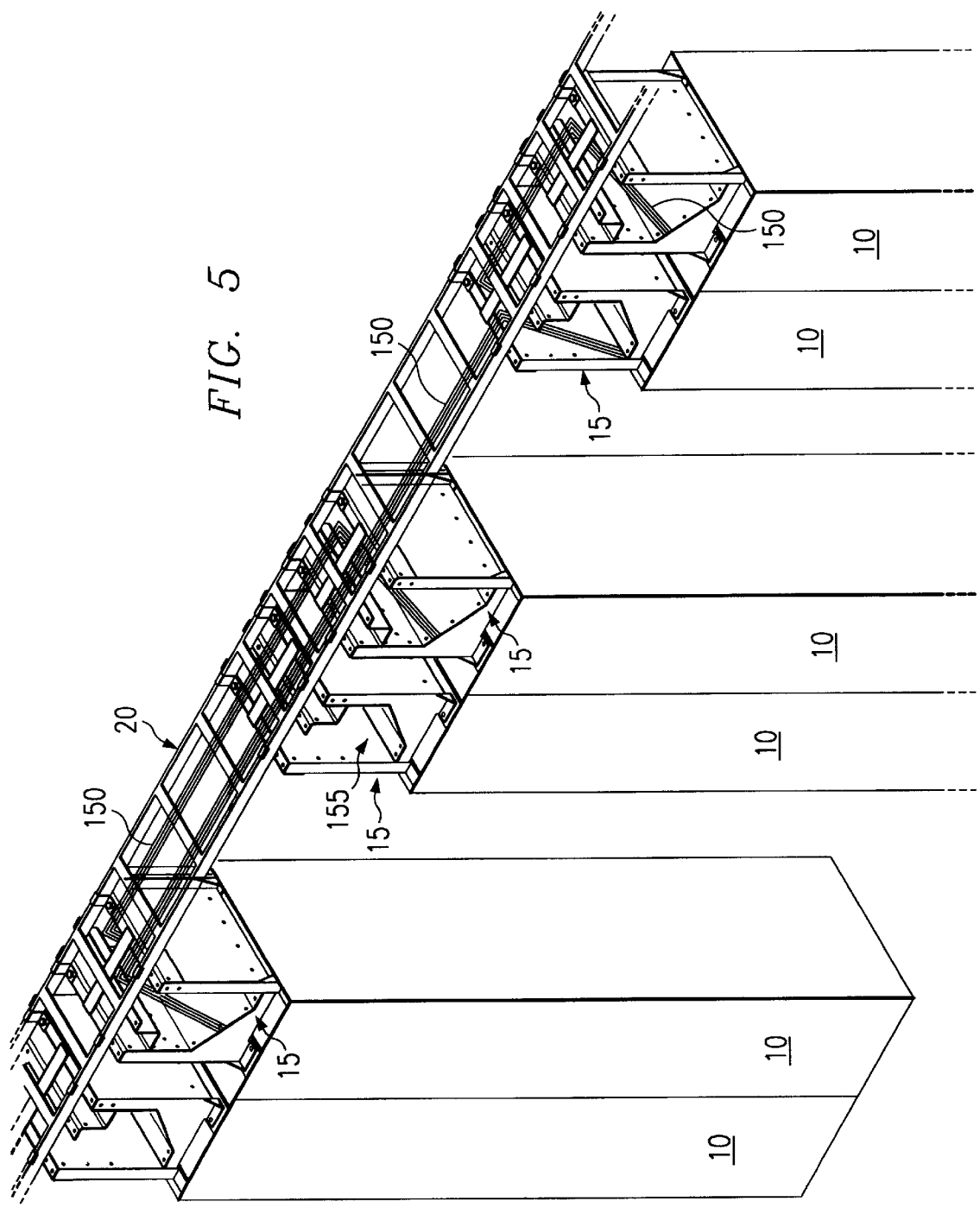
FIG. 5 depicts a typical cable routing through the overhead cabling system.

The cable ladder assemblies 20 are supported by the cable tray assemblies 15 and extend across the aisles 30 between suites 160. The main purpose of the cable ladder assemblies 20 is to allow cabling to be run cross-aisle between suites 160. The cable tray assemblies 15 are mounted to the tops of the switching cabinets 10 which provide the sole support for the cable tray assemblies 15. The cable tray assemblies 15 are used for running cable along a row switching cabinets 155, as illustrated in FIG. 5. Thus, the fact that cable ladder assemblies 20 are provided, permits cross-aisle routing cables and eliminates the need to route all cables fro a single point such as is done with the end chutes of prior art cabling systems.

Figure 2:
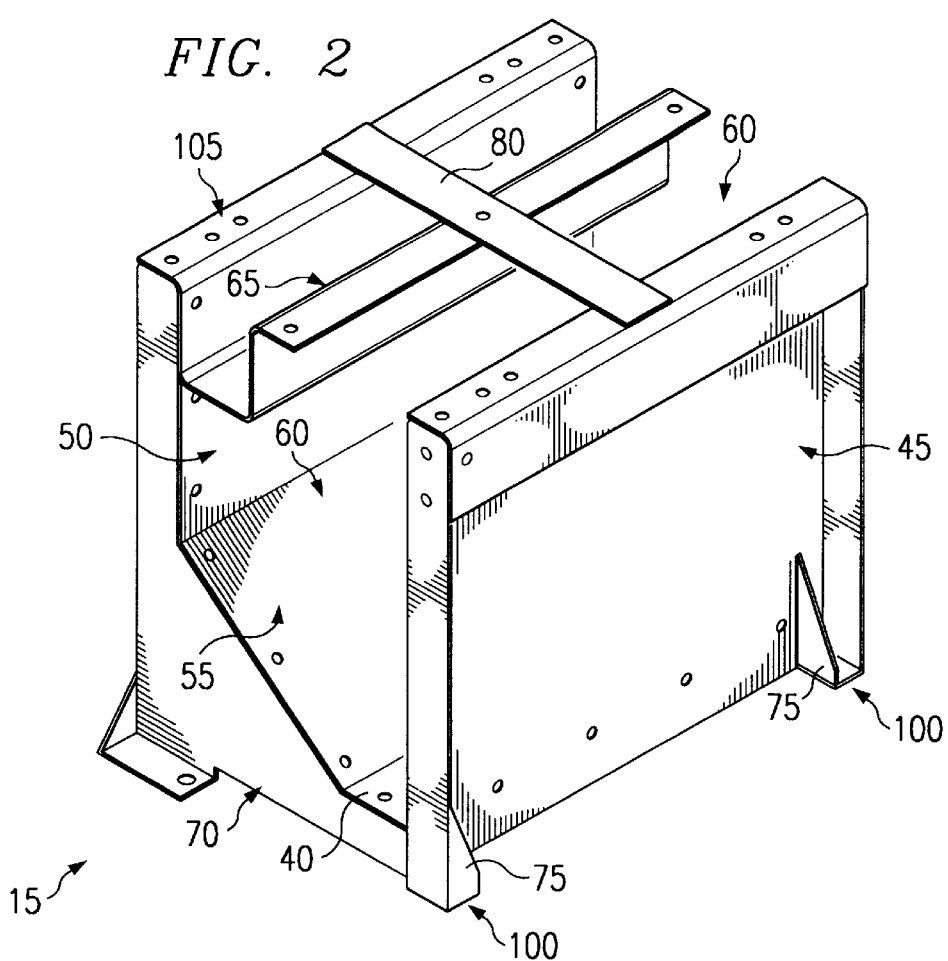
FIG. 2 depicts a cable tray assembly used in the overhead cabling system.
Figure 3:
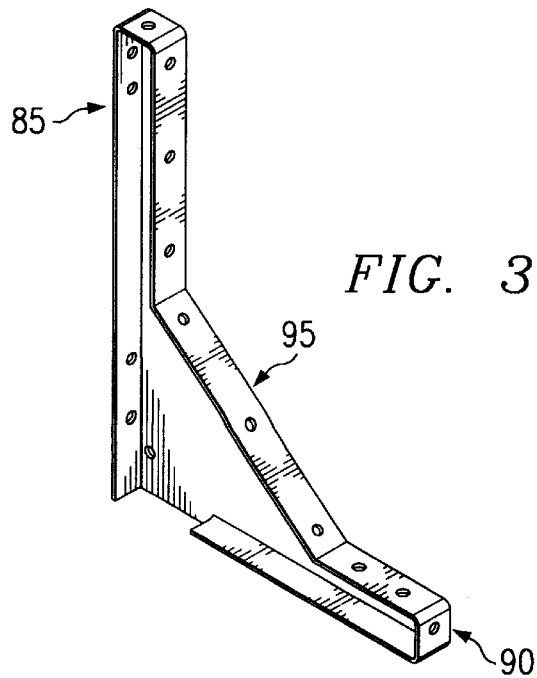
FIG. 3 illustrates a brace for a cable tray assembly used in the overhead cabling system.

Referring now to FIGS. 2 and 3, the cable tray assemblies 15 are shown in greater detail. The cable tray assemblies 15 are designed to mount on top of a switching cabinet 10. In the preferred embodiment of the invention, one cable tray assembly 15 is mounted on top of each switching cabinet 10.

The main components of the cable tray assemblies 15 include: a brace 70 at each of the two open ends 60, a front wall 45, a back wall 50, a bottom wall 40, an inclined wall 55. The cable tray assembly 15 is secured to the switching cabinet 10 by any suitable means such as conventional nut and bolt fasteners.

The braces 70 can be seen in FIG. 3. The braces 70 are a triangular shape with a vertical leg 85 extending to support the back wall 50, an hypotenuse side 95 which supports the inclined wall 55 and a horizontal leg 90 to support the bottom wall 40. The fact that inclined wall 55 is supported by braces 70 provides a cable tray assembly 15 that is strong and capable of sustaining seismic forces.

The cable tray assemblies 15 are also strengthened with stiffening elements. These are seen around the base of the cable tray assembly as stiffening gussets 75. The preferred shape for these gussets 75 is a triangle welded to the base of the cable tray assembly 15. They are used to help give the cable tray assembly 15 support along the longitudinal axis and the lateral axis and further increase its capacity to withstand seismic forces.

The cable tray assembly 15 also has a divider 65. The preferred embodiment for the divider 65 is a three sided trough attached to the back wall 50. The back wall 50 and divider 65 is secured by sheet metal screws or other suitable fasteners. The front wall 45 is perpendicular to the bottom wall 40. The cable tray assembly 15 is open at both ends as indicated at 60. The back wall 40 meets an inclined wall 55 so as to extend upward from the bottom wall 40 at an acute angle. The inclined back wall 55 helps direct heat away from the cabinet 10. In particular, when two cable tray assemblies 15 are placed on back-to-back cabinets 10, a "chimney effect" is created which promotes cooling of the cabinet 10 and the equipment contained therein.

The divider 65 is secured to the back wall 50 and extends generally parallel to the front wall 45 and parallel to the bottom wall 40. The divider 65 separates the space within the cable tray assembly 15 into two compartments. This configuration allows power cables to be segregated from other cables. A strap 80 is attached to the front wall 45 and back wall 50 as well as to the divider 65. The strap 65 helps hold the front wall 45 and the divider 65 in position. Which assists in making the system capable of meeting structural requirements for earthquake and seismic disturbance prone installations.

As previously mentioned, the cable tray assemblies 15 are mounted individually on the top of separate cabinets 10. The cable tray assemblies 15 are mounted at the factory or on site where the switching cabinets 10 are installed. The cable tray assemblies 15 are adapted to mount to the top of a switching cabinet 10 with a bottom mounting structure 100 and further adapted to hold the cable ladder in place with a top mounting structure 105.

Figure 4:
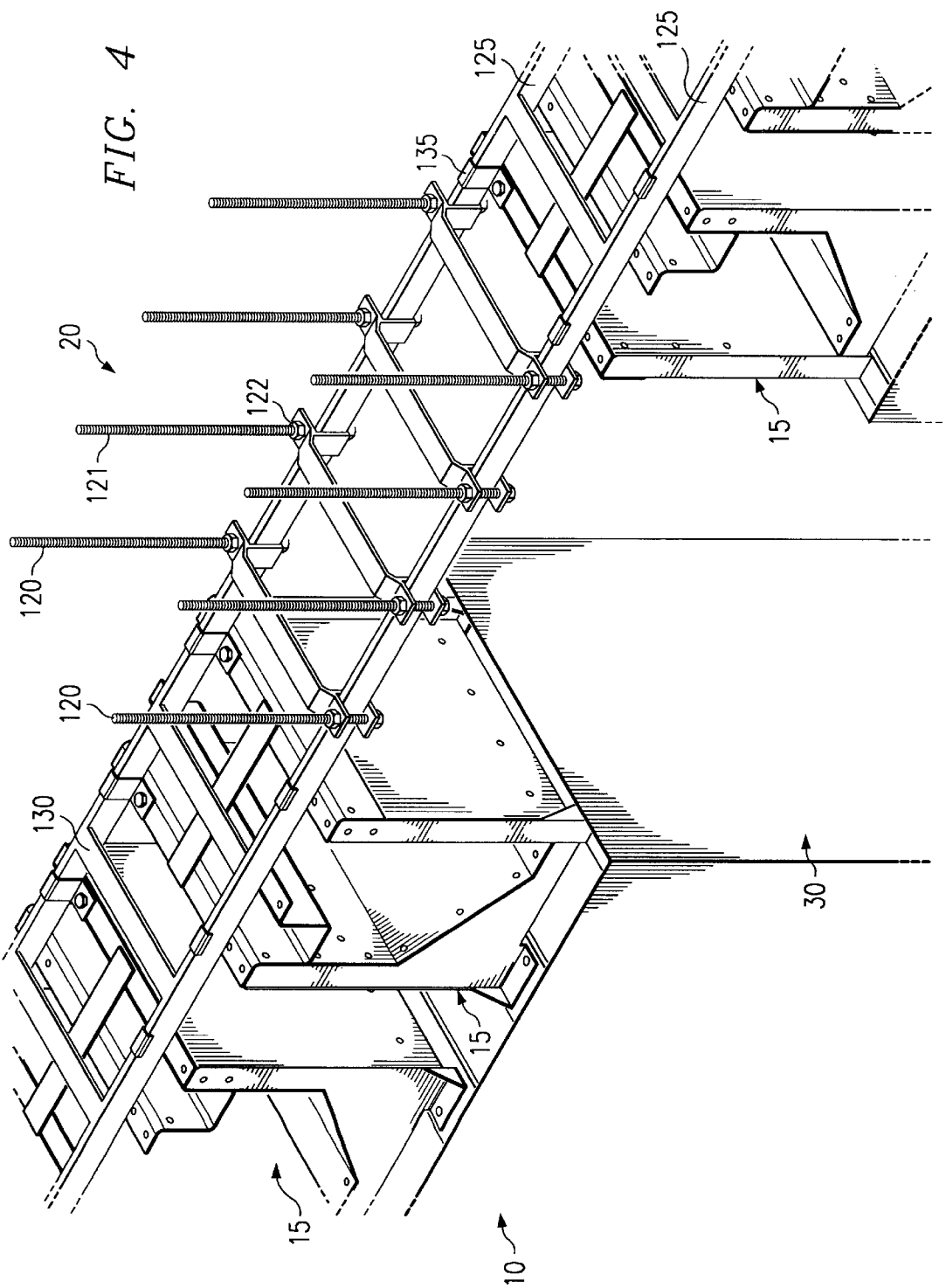
FIG. 4 depicts the cable tray assemblies and a cable ladder assembly.

Referring now to FIGS. 4 and 5, the cable ladder assembly 20 is shown. The cable ladder assemblies 20 are supported by the cable tray assemblies 15. Specifically, the cable ladder assemblies 20 are shown to extend across the aisles 30 between suites 160. The cable ladder assembly 20 may be placed along the suites 160 as needed. The preferred embodiment uses a cable ladder assembly 20 on each of the first two cabinets 10 in a suite 160 and then one cable ladder assembly 20 for every three cabinets 10. This is seen in the typical embodiment illustrated in the right side of FIG. 6. Thus, the cable ladder assemblies 20 allow cross-aisle cabling between cabinets 10 as shown in FIGS. 5 and 6.

According to one embodiment, the cable ladder assembly 20 comprises two parallel rails 125 disposed in spaced relation to one another by a plurality of tie bars 130 extending between the parallel rails 125. The tie bars 130 hold the parallel rails 125 in place similar to rungs on a ladder. In addition, the tie bars 130 support the cross-aisle cables 150 running across the cable ladder assembly 20. The cable ladders assembly also has side members 120 extending vertically from the parallel rails 120 to keep the cables 150 from falling off the sides of the cable ladder assembly 120. The preferred embodiment uses a rod 121 held in a bracket 122 designed to attach the to the parallel rails 120 and hold the rod 121 in a vertical orietation.

The cable ladder assembly 20 is adapted for mounting to the cable tray assembly 15 by a plurality of brackets 135. These brackets 135 include a hook-like element which engages a parallel rail 125.

Figure 6:
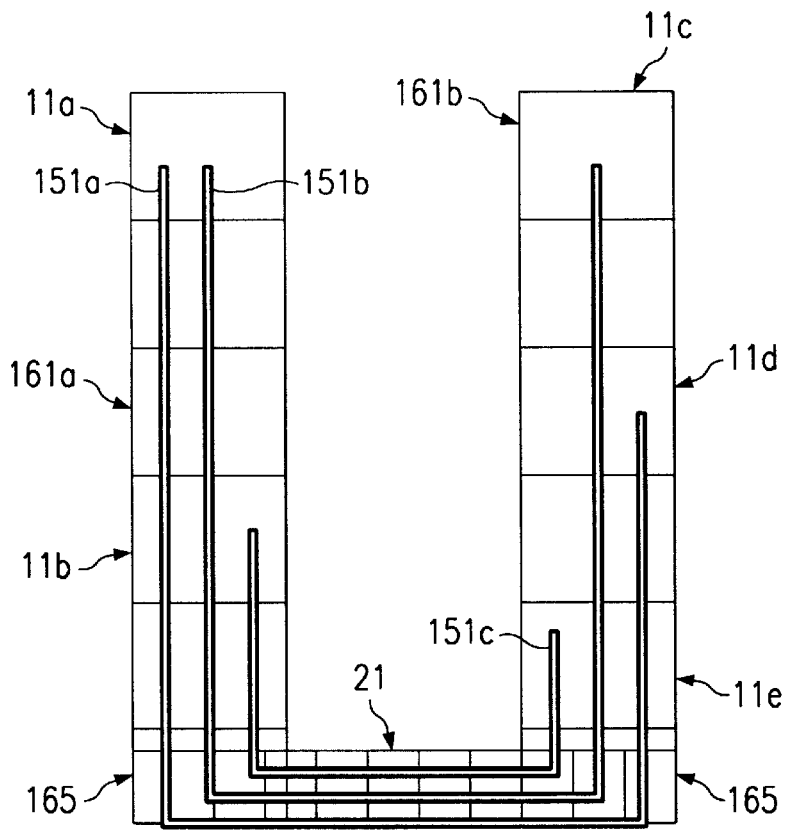
FIG. 6 depicts a top down schematic view of a typical embodiment of the prior art.
Figure 7:
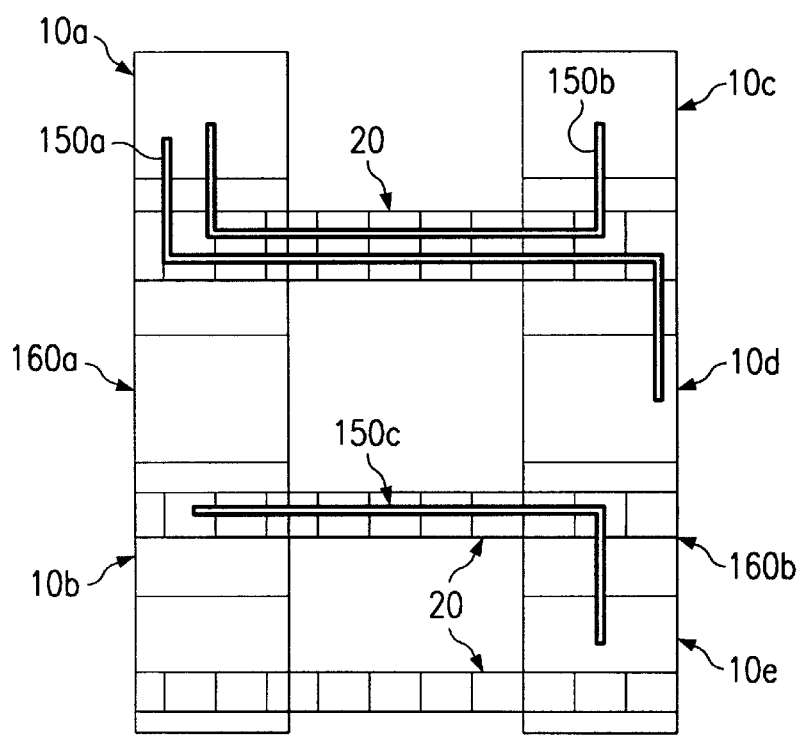
FIG. 7 depicts a top down schematic view of a typical embodiment of the present invention.

FIGS. 6 and 7 show a top down schematic view for a typical embodiment of a prior art wiring installation and a wiring installation using the overhead cabling system 7 of the present invention.

Specifically, FIG. 6 illustrates the routing of cables 151a, 151b, 151c from a first suite 161a of cabinets 11a, 11b to a second suite 161b of cabinets 11c, 11d, 11e. The wiring installation depicted in FIG. 7 routes cables 150a, 150b, 150c from a first suite 160a of cabinets 10a, 10b to a second suite 160b of cabinets 10c, 10d, 10e. As shown in FIG. 6, a first cable 151a is routed from a far end cabinet 11a of the first suite 161a and ends in the third cabinet 11d of the second suite 161b.

FIG. 7 depicts, a first cable 150a routed from a far end cabinet 10a of the first suite 160a and ends in the third cabinet 10d of the second suite 160b. By comparing the lengths of the cable 151a and cable 150a, the shorter and more direct cable routing of the present invention becomes apparent. This is an advantage for the present invention since it allows better heat dissipation because the cables 150 are not as crowded compared to a prior art cable end chute 165.

In addition, it allows the overhead cabling system 7 to be fixed or modified with less effort as compared to the prior art end chute 165, since it is easier for a technician to identify a specific cable 150 in the system as compared to a typical prior art cable end chute 165. The present invention also has the ability to handle a much greater number of cables 150, since the cables 150 are more distributed through the overhead cabling system 7, as compared to the bottle necked cable end chutes 165 of a typical system described in the prior art.

As shown in FIG. 6, a second cable 151b is routed from a far end cabinet 11a of the first suite 161a and ends in the far end cabinet 11c of the second suite 161b. FIG. 7 illustrates, a second cable 150b routed from a far end cabinet 10a of the first suite 160a and ends in the far end cabinet 10c of the second suite 160b. By comparing the lengths of the cable 151b and cable 150b, the shorter and more direct cable routing of the present invention is apparent.

Not only does the invention allow for shorter and more direct cross-aisle routing of cables 150, but it saves on material expense and installation time since the routings are shorter and easier to trouble shoot. As can be seen from the schematic in FIG. 6, the cable end chutes 165 quickly become a congested bottle neck with only three cables 151a, 151b, 151c. Since a typical installation contains thousands of cables, the bottleneck becomes unmanageable. The multiple cable ladder assemblies 20 of the invention allow for an increased cable routing capacity since there are more routes available to carry cross-aisle cables 150. This increased capacity allows the present invention to service telecommunications switching equipment that the prior art is incapable of supporting.

It can also be seen from comparing FIGS. 6 and 7 that a typical embodiment of the invention will require less floor space than a similar embodiment of the prior art since the space required by the cable end chutes 165 is no longer required. This will result in a cost savings since not only are material costs associated with the cable end chutes 165 eliminated, but the floor space may be used for revenue generating equipment.

The primary advantage of the overhead cabling system 7 of the present invention is that it allows shorter and more direct cable routings. The present invention is able to support up to one cable ladder assembly 20 for each pair of cross-aisle cabinets 10 instead of the prior arts limit of one ladder 21 for each pair of cross-aisle cable end chutes 165.

Thus the present invention frees up floor space, can handle more cables, allows shorter cable routes, and decreases installation time.

The present invention also meets Bellcore standards for Zone 4 earthquake areas. Bellcore Zone 4 is an industry standard familiar to those skilled in the art for a structures ability to with stand a seismic disturbance of a certain level.

While the invention has been described with reference to illustrative embodiments, this description is not intended to be construed in a limiting sense. Various modifications in combinations of the illustrative embodiments, as well as other embodiments of the invention, will be apparent to persons skilled in the art upon reference to the description.

What is claimed is:

1. An overhead cabling system for a telecommunications switching center, including a plurality of switching cabinets arranged in rows,
   a) a plurality of cable tray assemblies mounted on top of selected ones of said rows of said switching cabinets and
   b) at least one cable ladder assembly supported by said cable tray assemblies in spaced relationship to each other, said cable ladder assembly extending between at least two of said cable tray assemblies.

2. The overhead cabling system according to claim 1 wherein said cable tray assemblies include at least two mounting rails, mounted on top of said switching cabinets, and said cable tray assemblies supported in spaced relation above the top of the switching cabinets by said mounting rails.

3. The overhead cabling system according to claim 2 wherein said cable tray assemblies include a generally flat bottom wall, a front wall, a back wall, an inclined wall between said back wall and said bottom wall, and two open ends.

4. The overhead cabling system according to claim 3 wherein said cable tray assemblies further include at least one divider extending generally parallel to said front wall for dividing the cable tray assemblies into at least two separate compartments.

5. The overhead cabling system according to claim 4 wherein said cable tray assemblies include a one or more straps to connect the top edge of said front wall, the top edge of said back wall and the top edge of the divider.

6. The overhead cabling system according to claim 3 wherein said cable tray assemblies further include at least one angled divider attached to said back wall, with one side extending generally parallel to said front wall and the second side generally parallel to the bottom wall for dividing the cable tray assemblies into at least two separate compartments.

7. The overhead cabling system according to claim 3 wherein said cable tray assemblies further include a divider attached to said back wall, with one side extending generally parallel to said front wall, second side generally parallel to the bottom wall, open on both ends and a open top for dividing the cable tray assemblies into at least two separate compartments.

8. The overhead cabling system according to claim 3 wherein one of said cable tray assemblies further include two or more braces to hold said walls fixed in reference to each other, said braces being generally triangularly shaped with a vertical leg supporting the back wall, a horizontal leg supporting the bottom and a hypotenuse side supporting the inclined wall.

9. The cable tray assemblies according to claim 8 wherein said cable tray assemblies include a plurality of stiffening gussets to connect adjoining walls.

10. The cable tray assemblies according to claim 8 wherein said cable tray assemblies include a bottom mounting structure adapted to mount on top of a single switching cabinet for supporting said cable tray assemblies in spaced relation to the top of said switching cabinets.

11. The cable tray assemblies according to claim 8 wherein said cable tray assemblies include a top mounting structure adapted to mount said at least one cable ladder assembly on top of one of said cable ray assemblies.

12. The overhead cabling system according to claim 8 wherein said cable tray assemblies include two braces further adapted to be placed at each of the open ends of said cable tray assemblies.

13. The overhead cabling system according to claim 12 wherein said braces include an extension substantially perpendicular to the brace and continuing generally around the perimeter of said braces.

14. The overhead cabling system according to claim 12 wherein said front wall of said cable tray assemblies further include one or more stiffening elements.

15. The overhead cabling system according to claim 12 wherein said front wall of said cable tray assemblies further include one or more angle brackets to stiffen said cable tray assemblies along a longitudinal axis and one or more angle brackets to stiffen said cable tray assemblies along a lateral axis, said angle brackets are substantially triangular in shape.

16. The overhead cabling system according to claim 2 wherein said cable tray assemblies include a one or more straps to connect the top edge of said front wall and the top edge of said back wall.

17. The overhead cabling system according to claim 1 wherein said cable ladder assembly include:

a bottom member;

at least two side members; and two open ends, said side members retaining one or more cables entering from one open end and exiting through the other open end.

18. The overhead cabling system according to claim 17 wherein said cable ladder assembly include a bottom member consisting of two or more parallel rails held in spaced relationship with each other by a plurality of tie bars.

19. The overhead cabling system according to claim 1 wherein said cable ladder assembly include one or more openings through which said cables may run for connection to corresponding said cable tray assemblies of said switching cabinets.

20. The overhead cabling system according to claim 1 wherein said cable ladder assembly is mounted to the top of said cable tray assemblies.

21. A cabinet system for telecommunications equipment comprising:

a) a plurality of switching cabinets, each having a top surface, arranged in side by side relationship to form a row of said switching cabinets and b) a plurality of cable tray assemblies, each including a back wall, mounted individually to the top surface of respective ones of said switching cabinets in said row of said switching cabinets so that each of the cable tray assemblies is supported by one of said switching cabinets, wherein said back wall of each of the cable tray assemblies is inclined.

22. The cabinet system according to claim 21 wherein said cable tray assemblies include a generally flat bottom wall, a front wall, an inclined wall between said back wall and said bottom wall, and two open ends.

23. The cabinet system according to claim 22 wherein said cable tray assemblies further include a divider attached to said back wall, with one side extending generally parallel to said front wall, second side generally parallel to the bottom wall, open on both ends and a open top for dividing the cable tray assemblies into at least two separate compartments.

24. The cabinet system according to claim 21 wherein said cable ladder assembly include a bottom member consisting of two or more parallel rails held in spaced relationship with each other by a plurality of tie bars.

\* \* \* \* \*